US012007659B2

(12) United States Patent
Wang et al.

(10) Patent No.: US 12,007,659 B2
(45) Date of Patent: Jun. 11, 2024

(54) APPARATUS TO MAINTAIN A CONTINUOUSLY GRADED TRANSMISSION STATE

(71) Applicant: SAGE ELECTROCHROMICS, INC., Faribault, MN (US)

(72) Inventors: Yigang Wang, Plymouth, MN (US); Cody Daniel VanDerVeen, Faribault, MN (US); Peter Bocek, Northfield, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 0 days.

(21) Appl. No.: 17/819,451

(22) Filed: Aug. 12, 2022

(65) Prior Publication Data
US 2023/0044646 A1 Feb. 9, 2023

Related U.S. Application Data

(63) Continuation of application No. 16/717,386, filed on Dec. 17, 2019, now Pat. No. 11,435,643.
(Continued)

(51) Int. Cl.
*G02F 1/155* (2006.01)
*G02F 1/1523* (2019.01)
*G02F 1/163* (2006.01)

(52) U.S. Cl.
CPC ............ *G02F 1/155* (2013.01); *G02F 1/1525* (2013.01); *G02F 1/163* (2013.01)

(58) Field of Classification Search
CPC ........ G02F 1/155; G02F 1/1525; G02F 1/163; G02F 2201/56; E06B 9/24; E06B 2009/2464
(Continued)

(56) References Cited

U.S. PATENT DOCUMENTS

| 4,923,289 A | 5/1990 | Demiryont |
| 5,138,481 A | 8/1992 | Demiryont |

(Continued)

FOREIGN PATENT DOCUMENTS

| CN | 104898345 A | 9/2015 |
| CN | 107835958 A | 3/2018 |

(Continued)

OTHER PUBLICATIONS

International Search Report and Written Opinion for PCT/US2019/066856, dated Apr. 14, 2020, 11 pages.
(Continued)

*Primary Examiner* — Tuyen Tra
(74) *Attorney, Agent, or Firm* — Abel Schillinger, LLP; Robert N Young

(57) ABSTRACT

An apparatus including a substrate with at least three sides and an active stack on the substrate. The active stack can include a first transparent conductive layer, a second transparent conductive layer, an anodic electrochemical layer, and a cathodic electrochemical layer. The apparatus can also include a first bus bar set comprising a plurality of bus bars, wherein each bus bar of the first bus bar set is electrically coupled to the first transparent conductive layer, a second bus bar set comprising a plurality of bus bars, wherein each bus bar of the second bus bar set is electrically coupled to the second transparent conductive layer, and a bus bar arrangement wherein the bus bar arrangement comprises a bus bar from the first bus bar set and a bus bar from the second bus bar set on at least three sides of the substrate.

17 Claims, 7 Drawing Sheets

Related U.S. Application Data

(60) Provisional application No. 62/786,603, filed on Dec. 31, 2018.

(58) Field of Classification Search
USPC ............. 359/237, 238, 240, 245, 265, 266
See application file for complete search history.

(56) References Cited

U.S. PATENT DOCUMENTS

| | | |
|---|---|---|
| 5,999,012 A | 12/1999 | Listwan |
| 7,277,215 B2 | 10/2007 | Greer |
| 9,341,912 B2 | 5/2016 | Shrivastava et al. |
| 9,412,290 B2 | 8/2016 | Jack et al. |
| 9,563,097 B2 | 2/2017 | Ziebarth et al. |
| 9,778,532 B2 | 10/2017 | Pradhan |
| 10,429,712 B2 | 10/2019 | Jack et al. |
| 2013/0222877 A1 | 8/2013 | Greer et al. |
| 2013/0278988 A1 | 10/2013 | Jack et al. |
| 2013/0306615 A1 | 11/2013 | Rozbicki et al. |
| 2015/0070745 A1 | 3/2015 | Pradham |
| 2015/0109653 A1 | 4/2015 | Greer et al. |
| 2016/0097960 A1 | 4/2016 | Dixit et al. |
| 2016/0202591 A1 | 7/2016 | Greer |
| 2017/0097259 A1 | 4/2017 | Brown et al. |
| 2017/0130523 A1 | 5/2017 | Shrivastava et al. |
| 2017/0146884 A1 | 5/2017 | Vigano et al. |
| 2017/0195043 A1 | 7/2017 | Zhang et al. |
| 2017/0242315 A1 | 8/2017 | Ash et al. |
| 2018/0059498 A1 | 3/2018 | Coffin et al. |
| 2018/0088432 A1 | 3/2018 | Shrivastava et al. |
| 2018/0196323 A1 | 7/2018 | Wang et al. |
| 2018/0259822 A1 | 9/2018 | Dixit et al. |
| 2018/0284555 A1 | 10/2018 | Klawuhn et al. |
| 2019/0011798 A9 | 1/2019 | Brown et al. |
| 2019/0169926 A1 | 6/2019 | Shrivastava et al. |
| 2019/0221148 A1 | 7/2019 | Pradhan et al. |
| 2019/0242184 A1 | 8/2019 | Shrivastava et al. |
| 2020/0272015 A1 | 8/2020 | Wang |
| 2021/0173278 A1 | 6/2021 | Wang et al. |

FOREIGN PATENT DOCUMENTS

| | | |
|---|---|---|
| CN | 108646497 A | 10/2018 |
| CN | 109275336 A | 1/2019 |
| EP | 2791733 A1 | 10/2014 |
| EP | 3195301 A1 | 7/2017 |
| EP | 2791733 B1 | 10/2017 |
| EP | 2769042 B1 | 2/2018 |
| EP | 3356870 A1 | 8/2018 |
| EP | 3415984 A1 | 12/2018 |
| JP | 2004-537755 A | 12/2004 |
| JP | 2012-524290 A | 10/2012 |
| KR | 101200968 B1 | 11/2012 |
| KR | 101535100 B1 | 7/2015 |
| KR | 20180132040 A | 12/2018 |
| WO | 2003012541 A2 | 2/2003 |
| WO | 2009124647 A1 | 10/2009 |
| WO | 2010119228 A1 | 10/2010 |
| WO | 2013/090209 A1 | 6/2013 |
| WO | 2013158365 A1 | 10/2013 |
| WO | 2016044187 A1 | 3/2016 |
| WO | 2017059362 A1 | 4/2017 |
| WO | 2018067377 A1 | 4/2018 |
| WO | 2018119095 A1 | 6/2018 |
| WO | 2020471932 A1 | 8/2020 |
| WO | 2021119111 A1 | 6/2021 |

OTHER PUBLICATIONS

International Search Report and Written Opinion for PCT/US2020/016359, dated Jun. 3, 2020, 16 pages.

International Search Report and Written Opinion for PCT/US2020/063984, dated Mar. 15, 2021, 11 pages.

APPARATUS TO MAINTAIN A CONTINUOUSLY GRADED TRANSMISSION STATE

CROSS-REFERENCE TO RELATED APPLICATIONS

This application is a continuation and claims priority to U.S. patent application Ser. No. 16/717,386, entitled "APPARATUS TO MAINTAIN A CONTINUOUSLY GRADED TRANSMISSION STATE," by Yigang WANG et al., filed Dec. 17, 2019, which claims priority under 35 U.S.C. § 119(e) to U.S. Provisional Application No. 62/786,603, entitled "APPARATUS TO MAINTAIN A CONTINUOUSLY GRADED TRANSMISSION STATE," by Yigang WANG et al., filed Dec. 31, 2018, which is assigned to the current assignee hereof and incorporated herein by reference in its entirety.

BACKGROUND

Field of the Disclosure

The present disclosure is directed to electroactive devices, and more specifically to apparatuses including electrochromic devices and method of using the same.

Related Art

An electrochromic device can reduce the amount of sunlight entering a room or passenger compartment of a vehicle. Conventionally, all of an electrochromic device can be at a particular transmission state. For example, all of the electrochromic devices may be at 0% tinting, all may be at 100% tinting, or all may be at a value between the two. A glass pane may be formed with different discrete electrochromic devices, each controlled by its own pair of bus bars. The different electrochromic devices can each be controlled to a different transmission state. For example, an electrochromic device near the top of the pane may be at 100% tinting, another electrochromic device near the bottom of the pane may be at 0% tinting, and a further electrochromic device between the other two electrochromic devices may be at 50% tinting. Further improvement in control regarding tinting of an electrochromic device is desired.

BRIEF DESCRIPTION OF THE DRAWINGS

Embodiments are illustrated by way of example and are not limited in the accompanying figures.

Figure 1A:
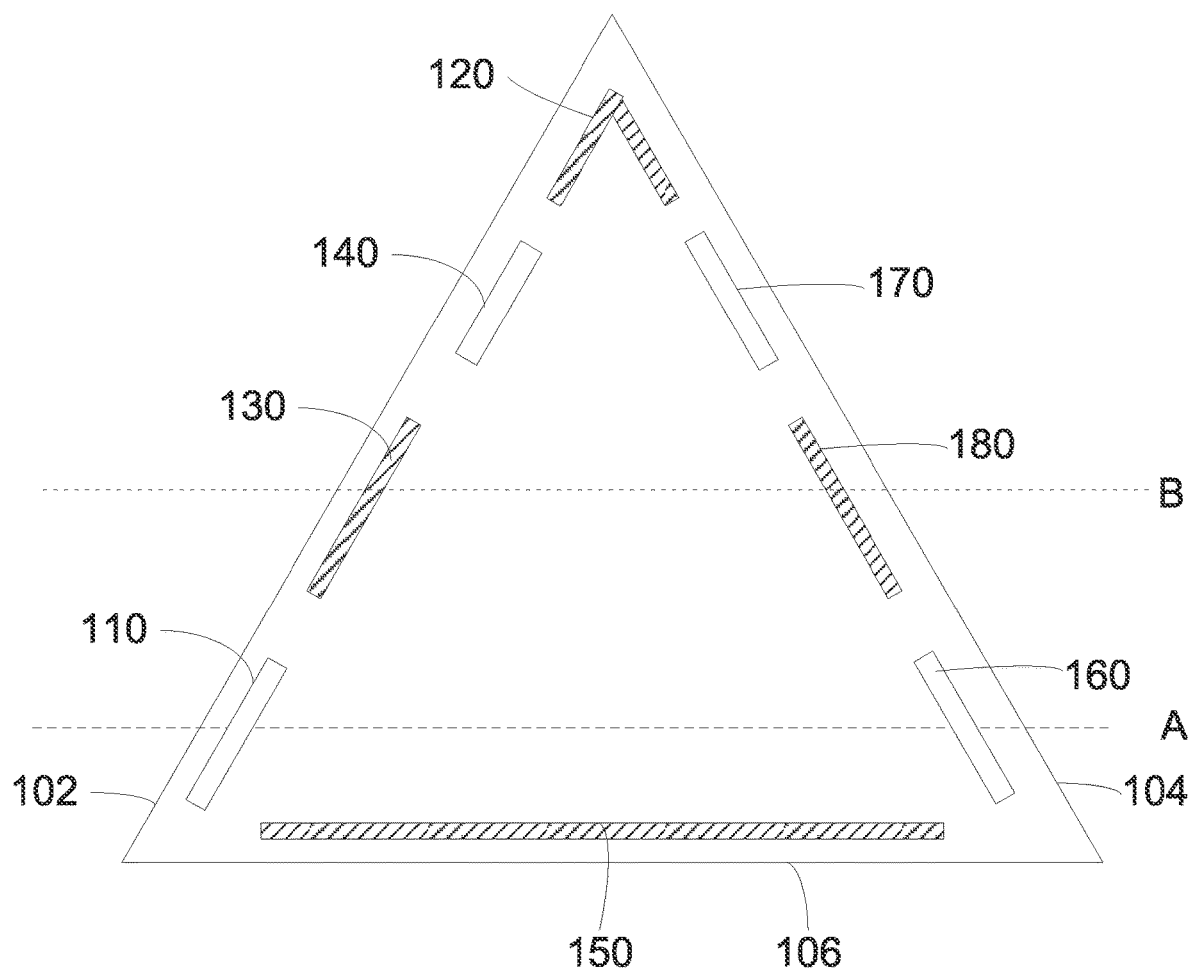
FIG. 1A includes an illustration of a top view of the substrate, a stack of layers of an electrochromic device, and bus bars, according to one embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

When referring to variables, the term "steady state" is intended to mean that an operating variable is substantially constant when averaged over 10 seconds, even through the operating variable may be change during a transient state. For example, when in steady state, an operating variable may be maintained within 10%, within 5%, or within 0.9% of an average for the operating variable for a particular mode of operation for a particular device. Variations may be due to imperfections in an apparatus or supporting equipment, such as noise transmitted along voltage lines, switching transistors within a control device, operating other components within an apparatus, or other similar effects. Still further, a variable may be changed for a microsecond each second, so that a variable, such as voltage or current, may be read; or one or more of the voltage supply terminals may alternate between two different voltages (e.g., 1V and 2V) at a frequency of 1 Hz or greater. Thus, an apparatus may be at steady state even with such variations due to imperfections or when reading operating parameters. When changing between modes of operation, one or more of the operating variables may be in a transient state. Examples of such variables can include voltages at particular locations within an electrochromic device or current flowing through the electrochromic device.

The use of the word "about," "approximately," or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

An electrochromic device can be maintained in a continuously graded transmission state for nearly any time period, for example, such as beyond the time needed for switching between states. When continuously graded, the electrochromic device can have a relatively higher electrical field between bus bars at an area with relatively less transmission and a relatively lower electrical field between the bus bars at another area with relative greater transmission. The continuous grading allows for a more visibly pleasing transition between less transmission to greater transmission, as compared to discrete grading. The varying locations of the bus bars can provide voltages that can range from fully bleached (highest transmission) to fully tinted (lowest transmission state), or anything in between. Still further, the electrochromic device can be operated with a substantially uniform transmission state across all of the area of the electrochromic device, with a continuously graded transmission state across all of the area of the electrochromic device, or with a combination of a portion with a substantially uniform transmission state and another portion with a continuously graded transmission state.

Many different patterns for the continuously graded transmission state can be achieved by the proper selection of bus bar location, the number of voltage supply terminals coupled to each bus bar, locations of voltage supply terminals along the bus bars, or any combination thereof. In another embodiment, gaps between bus bars can be used to achieve a continuously graded transmission state.

The electrochromic device can be used as part of a window for a building or a vehicle. The electrochromic device can be used within an apparatus. The apparatus can further include an energy source, an input/output unit, and a control device that controls the electrochromic device. Components within the apparatus may be located near or remotely from the electrochromic device. In an embodiment, one or more of such components may be integrated with environmental controls within a building.

The embodiments as illustrated in the figures and described below help in understanding particular applications for implementing the concepts as described herein. In the description below, an electrochromic device will be described as operating with voltages on bus bars being in a range of 0V to 50V. In one embodiment, the voltages can be between 0V and 25V. In another embodiment, the voltages can be between 0V and 10V. In yet another embodiment, the voltages can be between 0V and 3V. Such description is used to simplify concepts as described herein. Other voltage may be used with the electrochromic device or if the composition or thicknesses of layers within an electrochromic stack are changed. The voltages on bus bars may both be positive (0.1V to 50V), both negative (−50V to −0.1V), or a combination of negative and positive voltages (−1V to 2V), as the voltage difference between bus bars are more important than the actual voltages. Furthermore, the voltage difference between the bus bars may be less than or greater than 50V. After reading this specification, skilled artisans will be able to determine voltage differences for different operating modes to meet the needs or desires for a particular application. The embodiments are exemplary and not intended to limit the scope of the appended claims.

FIG. 1A includes an illustration of a top view of a substrate 100, a stack of layers of an electrochromic device, and bus bars, according to one embodiment. In one embodiment, the substrate 100 can have a triangular shape. In another embodiment, the substrate 100 can have a polygonal shape. A first bus bar 110 may be along a first side 102 of the substrate 100. In one embodiment, the first bus bar 110 may be connected to a first transparent conductive layer. A second bus bar 120 can be along the first side 102 and a second side 104. In one embodiment, the second bus bar 120 can be connected to a second transparent conductive layer, as will be described in more detail below. The first side 102 can be adjacent to the second side 104. In one embodiment, the first side 102 and the second side 104 can create an acute angle. In another embodiment, the first side 102 and the second side 104 create a 90° angle. In another embodiment, the first side 102 and the second side 104 create an obtuse angle. In one embodiment, the substrate 100 can include a third side 106 connected to the first side 102 and the second side 104. In one embodiment, the first side 102, second side 104, and third side 106 form a triangular shape. A third bus bar 130 can be along the first side 102 of the substrate 100 between the first bus bar 110 and the second bus bar 120. In one embodiment, the third bus bar 130 is connected to the second transparent conductive layer. A fourth bus bar 140 may also be along the first side 102 of the substrate 100 between the third bus bar 130 and the second bus bar 120. In one embodiment, the fourth bus bar may be electrically connected to the first transparent conductive layer. In one embodiment, the first bus bar 110 and the third bus bar 130 are generally parallel each other. In another embodiment, the first bus bar 110 and the fourth bus bar 140 are generally parallel each other. As used herein, substantially parallel is intended to mean that the two bus bars can be within 10 degrees of each other, such as within 5 degrees of each other, such as within 4 degrees of each other, such as within 2 degrees of each other, or such as within 1 degree of each other.

A fifth bus bar 150 may be along the third side 106 of the substrate 100. In one embodiment, the fifth bus bar 150 is the only bus bar along the third side 106. In one embodiment, the fifth bus bar 150 may be electrically connected to the second transparent conductive layer. In one embodiment, the fifth bus bar may have a length that extends a majority of the distance of the third side 106. As will be discussed in more detail below with respect to FIG. 1A and FIG. 1B, the first bus bar 110, the fourth bus bar 140, the sixth bus bar 160, and the seventh bus bar 170 can be electrically connected to a first transparent conductive layer while the second bus bar 120, the third bus bar 130, the fifth bus bar 150, and the eighth bus bar 180 can be connected to a second transparent conductive layer. In another embodiment, the first bus bar 110, the fourth bus bar 140, the sixth bus bar 160, and the seventh bus bar 170 can be electrically connected to the second transparent conductive layer while the second bus bar 120, the third bus bar 130, the fifth bus bar 150, and the eighth bus bar 180 can be connected to the first transparent conductive layer.

A sixth bus bar 160 may be along the second side 104 of the substrate 100. In one embodiment, the sixth bus bar 160 may be electrically coupled to the first transparent conductive layer. In one embodiment, the sixth bus bar 160 may be substantially the same length as the first bus bar 110. A seventh bus bar 170 may be along the second side 104 between the second bus bar 120 and the sixth bus bar 160. In one embodiment, the seventh bus bar 170 may be electrically connected to the first transparent conductive layer. An eighth bus bar 180 may be along the second side 104 between the sixth bus bar 160 and the seventh bus bar 170. In one embodiment, the eighth bus bar 180 may be electrically connected to the second transparent conductive layer. In one embodiment, a bus bar arrangement can include a pattern of alternating a first bus bar set—where each bus bar from the first bus bar set is coupled to the first transparent conductive layer—with a second bus bar set—where each bus bar from the second bus bar set is coupled to the second transparent conductive layer—around the edge of the substrate 100. In one embodiment, the second bus bar 120, the fourth bus bar 140, and the seventh bus bar 170 create a first zone, the third bus bar 130 and the eighth bus bar 180 create a second zone, and the first bus bar 110, the sixth bus bar 160 and the fifth bus bar 150 create a third zone. In one embodiment, the first zone may be fully tinted, the second zone may be held at a transmissivity less than the first zone, and the third zone may be fully clear. A plurality of zones can be created from the plurality of bus bars. In one embodiment, the substrate can include at least three zones, such as four zones, or five zones, or six zones, or seven zones, or twenty zones. In one embodiment, the apparatus can include from two to one-hundred zones.

In one embodiment, the first bus bar 110 can be connected to a first voltage supply terminal, the second bus bar 120 can be connected to a second voltage supply terminal, the third bus bar can be connected to a third voltage supply terminal, and the fourth bus bar 140 can be connected to a fourth voltage supply terminal. In one embodiment, the voltage supply terminals can be connected to each bus bar 110, 120, 130, and 140 about the center of each bus bar. In one embodiment, each bus bar 110, 120, 130, and 140 can have one voltage supply terminal. The ability to control each voltage supply terminal can provide for control over grading of light transmission through the electrochromic device 124.

In one embodiment, the first voltage supply terminal can set the voltage for the first bus bar 110 at a value less than the voltage set by the voltage supply terminal for the third bus bar 130. In another embodiment, the voltage supply terminal can set the voltage for the third bus bar 130 at a value greater than the voltage set by the voltage supply terminal for the fourth bus bar 140. In another embodiment, the voltage supply terminal can set the voltage for the third bus bar 130 at a value less than the voltage set by the voltage supply terminal for the fourth bus bar 140. In another embodiment, the voltage supply terminal can set the voltage for the first bus bar 110 at a value about equal to the voltage set by the voltage supply terminal for the fourth bus bar 140. In another embodiment, the voltage supply terminal for the fifth bus bar 150 can set the voltage at a value less than the voltage set by the voltage supply terminal for the third bus bar 130. In another embodiment, the voltage supply terminal for the second bus bar 120 can set the voltage at a value greater than the voltage set by the voltage supply terminal for the third bus bar 130. In another embodiment, the voltage supply terminal for the eighth bus bar 180 can set the voltage at a less than the voltage set by the voltage supply terminal for the second bus bar 120. In another embodiment, the voltage supply terminal can set the voltage for the seventh bus bar 170 at a value about equal to the voltage set by the voltage supply terminal for the sixth bus bar 160. In another embodiment, the voltage supply terminal can set the voltage for the third bus bar 130 at a value about equal to the voltage set by the voltage supply terminal for the eighth bus bar 180. In another embodiment, the voltage supply terminal can set the voltage for the first bus bar 110 at a value about equal to the voltage set by the voltage supply terminal for the eighth bus bar 180.

In one embodiment, the voltage supply terminal can set the voltage for the first bus bar 110 at a value within about 0.5V, such as 0.4V, such as 0.3V, such as 0.2V, such as 0.1V to the voltage set by the voltage supply terminal for the fourth bus bar 140. In a non-limiting example, the first voltage supply terminal can set the voltage for the first bus bar 110 at 0V, the second voltage supply terminal can set the voltage for the second bus bar 120 at 3V, the third voltage supply terminal can set the voltage for the third bus bar 130 at 2V, the fourth voltage supply terminal can set the voltage for the fourth bus bar 140 at 0V, and the fifth voltage supply terminal can set the voltage for the fifth bus bar 150 at 1V.

Figure 1B:
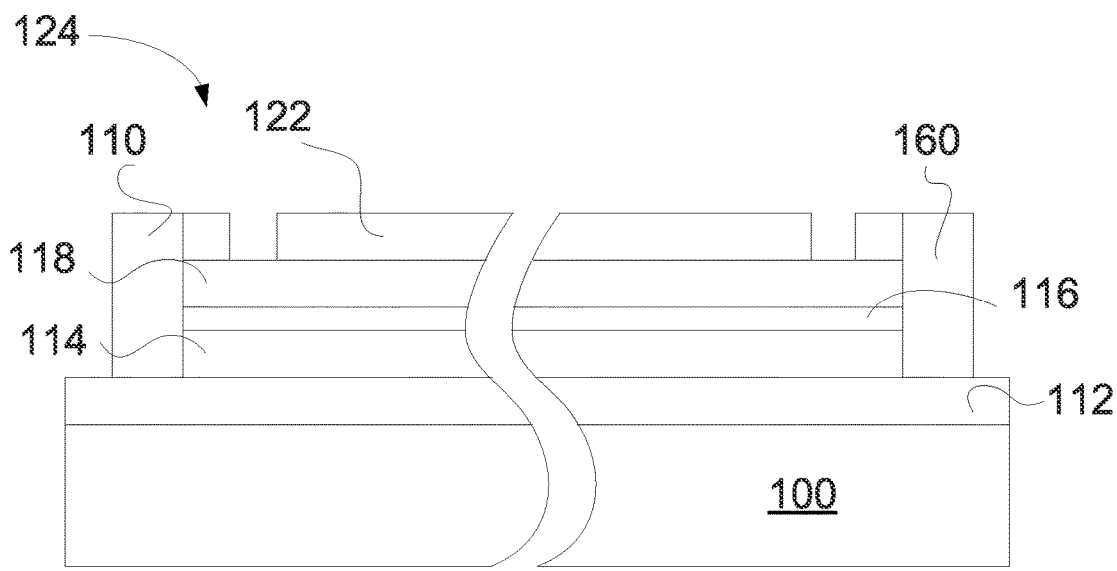
FIG. 1B includes an illustration of a cross-sectional view along line A of a portion of a substrate, a stack of layers for an electrochromic device, and bus bars, according to one embodiment.

FIG. 1B includes an illustration of a cross-sectional view along line A of a portion of a substrate 100, a stack of layers 112, 114, 118, and 122 for an electrochemical device 124, and bus bars, according to one embodiment. In one embodiment, the electrochemical device 124 is an electrochromic device. The electrochemical device 124 can include a first transparent conductive layer 112, a cathodic electrochemical layer 114, an anodic electrochemical layer 118, and a second transparent conductive layer 122. In one embodiment, the electrochromic device 124 can also include an ion conducting layer 116 between the cathodic electrochemical layer 114 and the anodic electrochemical layer 118. In one embodiment, the first transparent conductive layer 112 can be between the substrate 100 and the cathodic electrochemical layer 114. The cathodic electrochemical layer 114 can be between the first transparent conductive layer 112 and the anodic electrochemical layer 118. In one embodiment, the anodic electrochemical layer 118 can be between the cathodic electrochemical layer 114 and the second transparent conductive layer 122.

The substrate 100 can include a glass substrate, a sapphire substrate, an aluminum oxynitride substrate, a spinel substrate, or a transparent polymer. In a particular embodiment, the substrate 100 can be float glass or a borosilicate glass and have a thickness in a range of 0.025 mm to 4 mm thick. In another particular embodiment, the substrate 100 can include ultra-thin glass that is a mineral glass having a thickness in a range of 10 microns to 300 microns. The first transparent conductive layers 112 and second transparent conductive layer 122 can include a conductive metal oxide or a conductive polymer. Examples can include a indium oxide, tin oxide or a zinc oxide, either of which can doped with a trivalent element, such as Sn, Sb, Al, Ga, In, or the like, or a sulfonated polymer, such as polyaniline, polypyrrole, poly(3,4-ethylenedioxythiophene), or the like or one or several metal layer(s) or a metal mesh or a nanowire mesh or graphene or carbon nanotubes or a combination thereof. The transparent conductive layers 112 and 122 can have the same or different compositions.

The cathodic electrochemical layer 114 and the anodic electrochemical layer 118 can be electrode layers. In one embodiment, the cathodic electrochemical layer 114 can be an electrochromic layer. In another embodiment, the anodic electrochemical layer 118 can be a counter electrode layer. The electrochromic layer can include an inorganic metal oxide electrochemically active material, such as $WO_3$, $V_2O_5$, $MoO_3$, $Nb_2O_5$, $TiO_2$, CuO, $Ir_2O_3$, $Cr_2O_3$, $Co_2O_3$, $Mn_2O_3$, or any combination thereof and have a thickness in a range of 20 nm to 2000 nm. The counter electrode layer can include any of the materials listed with respect to the electrochromic layer and may further include nickel oxide (NiO, $Ni_2O_3$, or combination of the two) or iridium oxide, and Li, Na, H, or another ion and have a thickness in a range of 20 nm to 1000 nm. The ion conductive layer 116 (sometimes called an electrolyte layer) can be optional, and can have a thickness in a range of 1 nm to 1000 nm in case of an inorganic ion conductor or 5 microns to 1000 microns in case of an organic ion conductor. The ion conductive layer 116 can include a silicate with or without lithium, aluminum, zirconium, phosphorus, boron; a borate with or without lithium; a tantalum oxide with or without lithium; a lanthanide-based material with or without lithium; another lithium-based ceramic material particularly LixMOyNz where M is one or a combination of transition metals or the like.

In one embodiment, the first bus bar 110 and the sixth bus bar 160 are electrically connected to the first transparent conductive layer 112, as seen along line A. In one embodiment, the first transparent conductive layers 112 includes portions removed, so that the first bus bar 110 and the sixth bus bar 160 are not electrically connected to third bus bar 130 and the eighth bus bar 180. Such removed portions are typically 20 nm to 2000 nm wide. In another embodiment, the third bus bar 130 and the eighth bus bar 180 are electrically connected to the first transparent conductive layer 112. In one embodiment, the first bus bar 110 is on one side of the stack of layers of the electrochemical device 124 and the sixth bus bar 160 is on the opposite side of the stack of layers of the electrochemical device 124. In a particular embodiment, the first bus bar 110 and the sixth bus bar 160 can be electrically connected to the cathodic electrochemical layer 114 via the first transparent conductive layer 112. In a particular embodiment, the first bus bar 110 and the sixth bus bar 160 can be electrically connected to the anodic electrochemical layer 118 via the second transparent conductive layer 122.

Figure 1C:
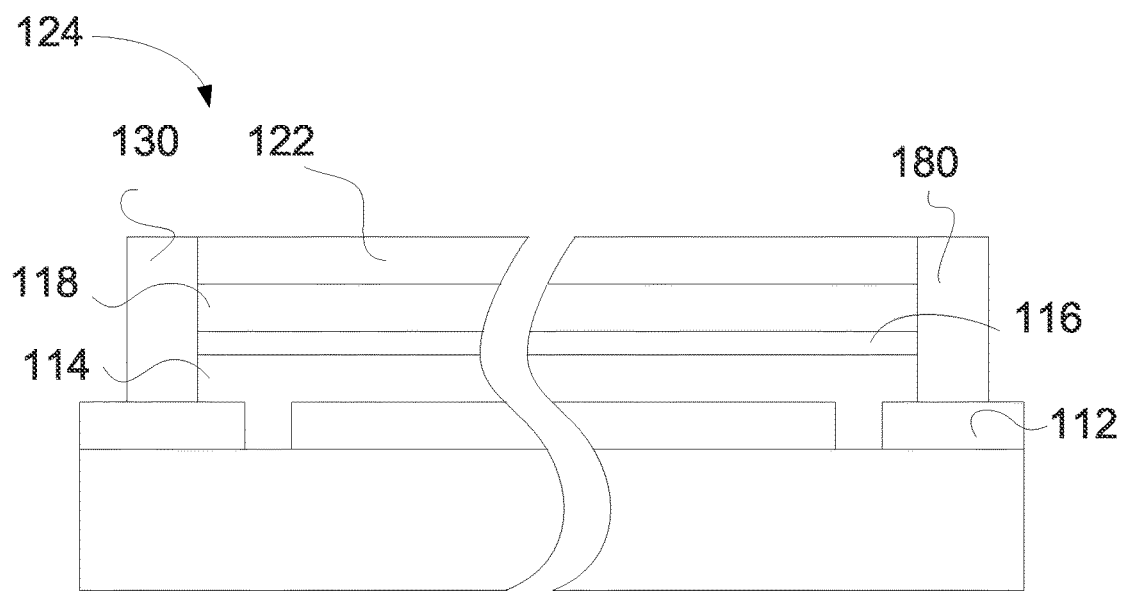
FIG. 1C includes an illustration of a cross-sectional view along line B of a portion of a substrate, a stack of layers for an electrochromic device, and bus bars, according to one embodiment.

FIG. 1C includes an illustration of a cross-sectional view along line B of a portion of the substrate 100, the stack of layers 112, 114, 118, and 122 for the electrochemical device 124, and bus bars, according to one embodiment. In one embodiment, the third bus bar 130 and the eighth bus bar 180 are electrically connected to the second transparent conductive layer 122, as seen along line B. In one embodiment, the second transparent conductive layers 122 includes portions removed, so that the third bus bar 130 and the eighth bus bar 180 are not electrically connected to first bus bar 110 and the sixth bus bar 160. Such removed portions are typically 20 nm to 2000 nm wide. In another embodiment, the first bus bar 110 and the sixth bus bar 160 are electrically connected to the second transparent conductive layer 122. In one embodiment, the third bus bar 130 is on one side of the stack of layers of the electrochemical device 124 and the eighth bus bar 180 is on the opposite side of the stack of layers of the electrochemical device 124. In a particular embodiment, the third bus bar 130 and the eighth bus bar 180 can be electrically connected to the anodic electrochemical layer 118 via the second transparent conductive layer 122. In a particular embodiment, the third bus bar 130 and the eighth bus bar 180 can be electrically connected to the cathodic electrochemical layer 114 via the second transparent conductive layer 112.

The first bus bar 110, the second bus bar 120, the third bus bar 130, the fourth bus bar 140, the fifth bus bar 150, the sixth bus bar 160, the seventh bus bar 170, and the eighth bus bar 180 can include a conductive material. In an embodiment, each of the bus bars 110, 120, 130, 140, 150, 160, 170, and 180 can be formed using a conductive ink, such as a silver frit, which is printed over the transparent conductive layer 122. In another embodiment, one or more of the bus bars 110, 120, 130, 140, 150, 160, 170, and 180 can include a metal-filled polymer, such as a silver-filled epoxy.

Figure 1D:
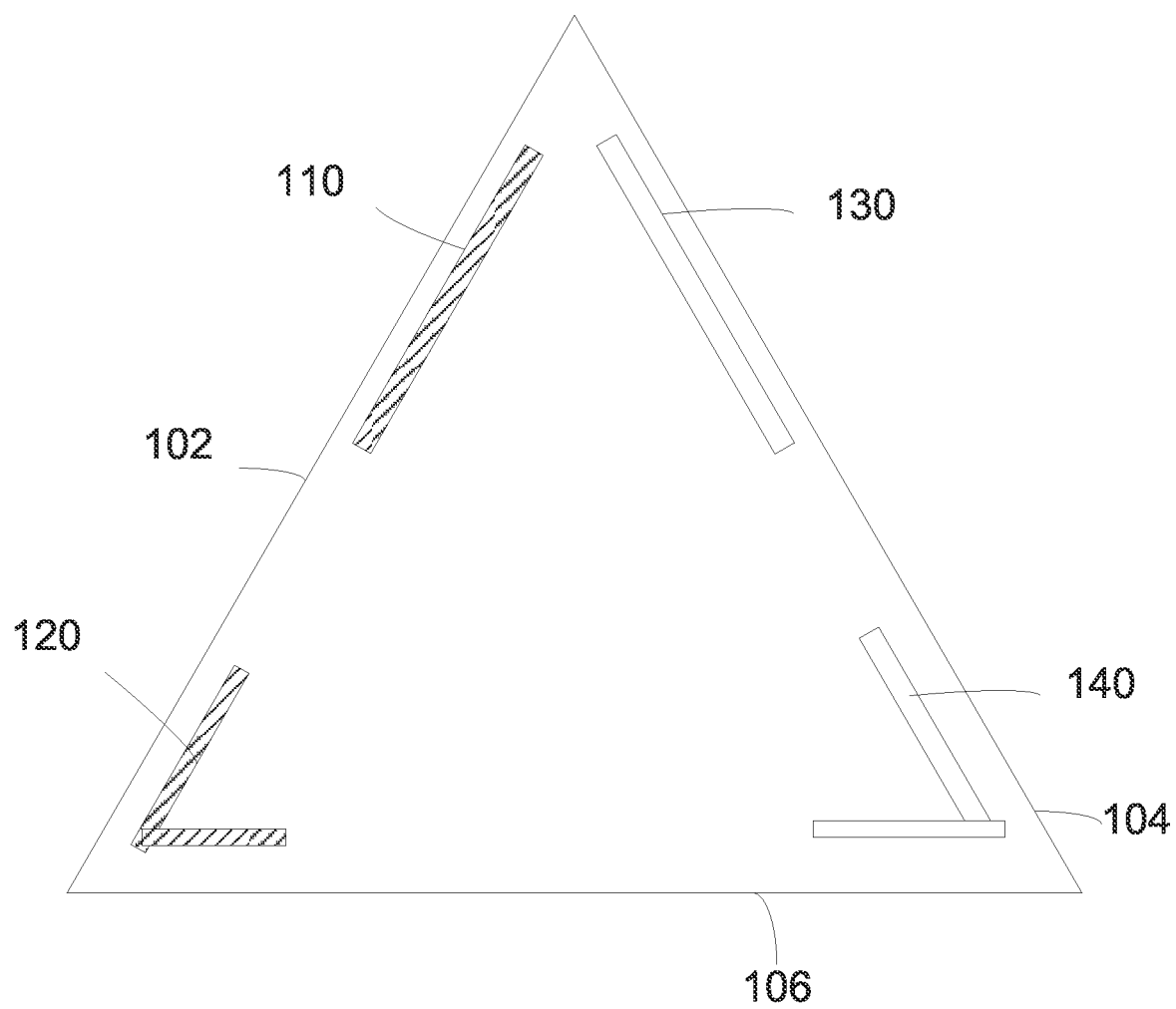
FIG. 1D includes an illustration of a top view of the substrate, a stack of layers of an electrochromic device, and bus bars, according to another embodiment.

FIG. 1D includes an illustration of a top view of a substrate 100, a stack of layers of an electrochromic device, and bus bars, according to another embodiment. In one embodiment, the substrate 100 can have a triangular shape. A first bus bar 110 may be along a first side 102 of the substrate 100. In one embodiment, the first bus bar 110 may be connected to a first transparent conductive layer. A second bus bar 120 can be along the first side 102 and a second side 106. In one embodiment, the second bus bar 120 can be connected to the first transparent conductive layer. The first side 102 can be adjacent to the second side 106. In one embodiment, the first side 102 and the second side 106 can create an acute angle. In another embodiment, the first side 102 and the second side 106 create a 90° angle. In another embodiment, the first side 102 and the second side 106 create an obtuse angle. In one embodiment, the substrate 100 can include a third side 104 connected to the first side 102 and the second side 106. In one embodiment, the first side 102, second side 106, and third side 104 form a triangular shape. A third bus bar 130 can be along the third side 104 of the substrate. In one embodiment, the third bus bar 130 is connected to a second transparent conductive layer. A fourth bus bar 140 may also be along the second side 106 and the third side 104 of the substrate 100. In one embodiment, the fourth bus bar 140 may be electrically connected to the second transparent conductive layer.

In one embodiment, the first bus bar 110 and a segment of the second bus bar 120 are generally parallel each other. As used herein, substantially parallel is intended to mean that the two bus bars can be within 10 degrees of each other, such as within 5 degrees of each other, such as within 4 degrees of each other, such as within 2 degrees of each other, or such as within 1 degree of each other. In one embodiment, the first bus bar 110 may have a length that extends a majority of the distance of the first side 102. In another embodiment, a segment of the second bus bar 120 along the first side 102 may extend a majority of the distance of the first side 102. In another embodiment, the third bus bar 130 may have a length that extends a majority of the distance of the third side 104. In another embodiment, a segment of the fourth bus bar 140 along the third side 104 may have a length that extends a majority of the distance of the third side 104. In one embodiment, at least two bus bars are adjacent to at least two sides of the substrate 100 and each bus bar is connected to a different transparent conductive layer.

In one embodiment, the first bus bar 110 can be connected to a first voltage supply terminal, the second bus bar 120 can be connected to a second voltage supply terminal, the third bus bar can be connected to a third voltage supply terminal, and the fourth bus bar 140 can be connected to a fourth voltage supply terminal. In one embodiment, the voltage supply terminals can be connected to each bus bar 110, 120, 130, and 140 about the center of each bus bar. In one embodiment, each bus bar 110, 120, 130, and 140 can have one voltage supply terminal. The ability to control each voltage supply terminal can provide for control over grading of light transmission through the electrochromic device 124.

Figure 2:
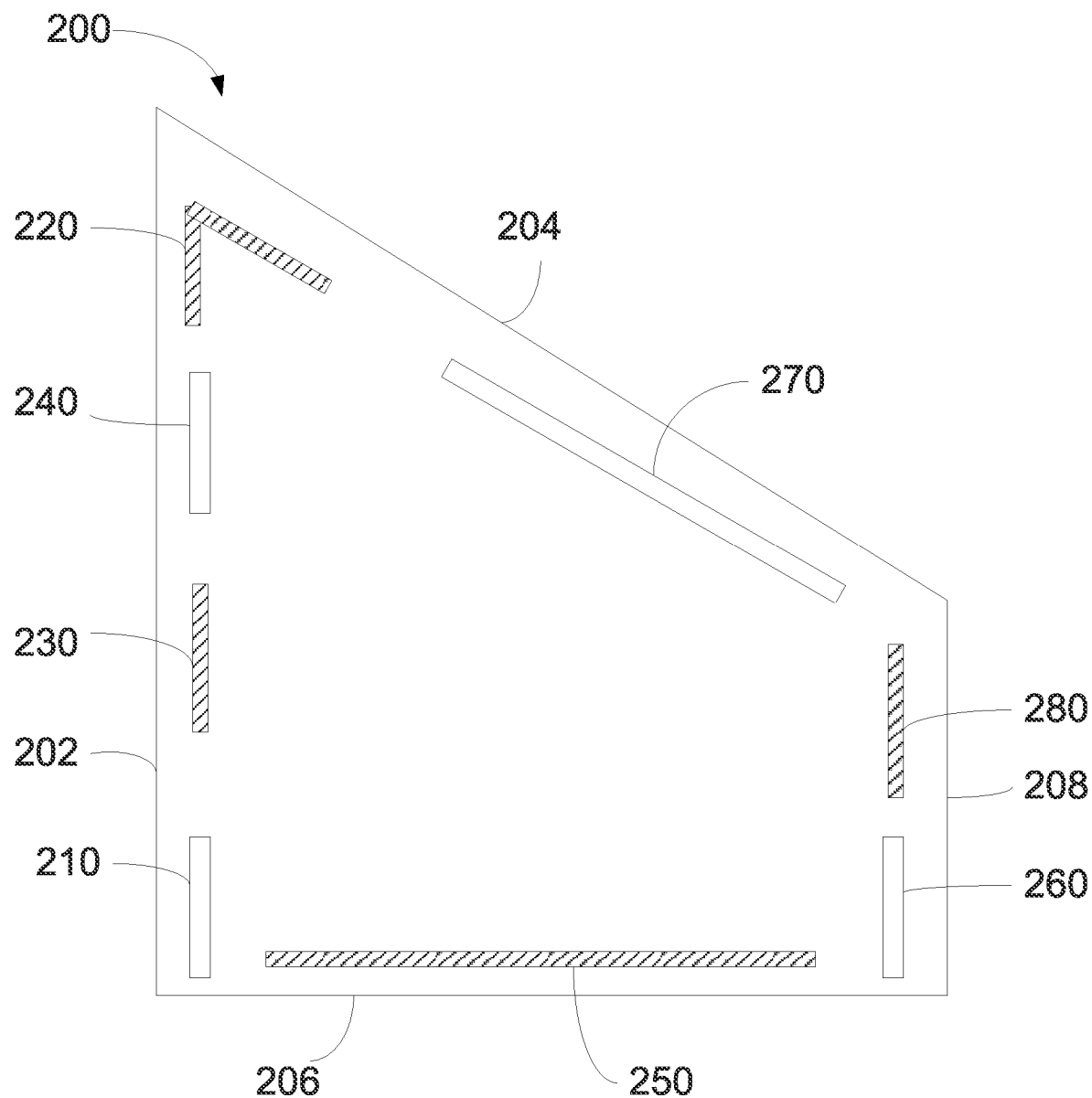
FIG. 2 includes an illustration of a top view of the substrate, a stack of layers of an electrochromic device, and bus bars, according to one embodiment.
Figure 3:
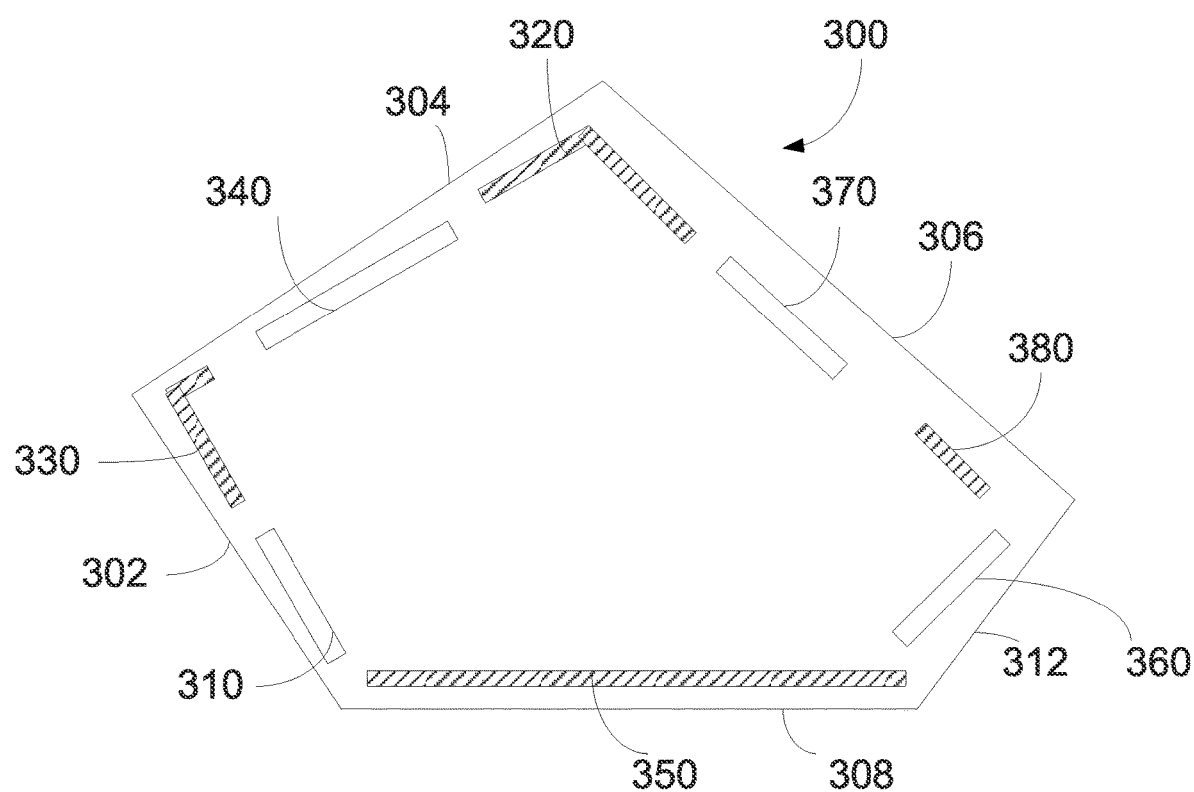
FIG. 3 includes an illustration of a top view of the substrate, a stack of layers of an electrochromic device, and bus bars, according to one embodiment.

The configuration and number of bus bars is not limited to the embodiment as shown in FIGS. 1A-1D. FIG. 2 includes an illustration of a top view of the substrate 100, a stack of layers 112, 114, 118, and 122 of an electrochromic device 200, and bus bars, according to one embodiment. As seen in FIG. 2, the electrochemical device 200 can include more than three bus bars, such as more than four bus bars, such as more than five bus bars, such as more than six bus bars, such as more than seven bus bars. The electrochemical device 200 can include a first bus bar 210, a second bus bar 220, a third bus bar 230, a fourth bus bar 240, a fifth bus bar 250, a sixth bus bar 260, a seventh bus bar 270, and an eighth bus bar 280. In one embodiment, a gap can be between each bus bar. In one embodiment, the first bus bar 210, the fourth bus bar 240, the sixth bus bar 260, and the seventh bus bar 270 can be connected to a first transparent conductive layer while the second bus bar 220, the third bus bar 230, the fifth bus bar 250, and the eighth bus bar 280 can be connected to a second transparent conductive layer. In one embodiment, the substrate 100 can include at least four sides, such as five sides, or six sides, or seven sides, or eight sides. In one embodiment, at least one side may be non-parallel to any other side. In one embodiment, the substrate 100 may be a polygon. In one embodiment, the substrate 100 may be a trapezoid, as seen in FIG. 2. In one embodiment, the substrate 100 may be a pentagon, as seen in FIG. 3. The electrochromic device 200 may include a bus bar arrangement. The bus bar arrangement can include a pattern of a first bus bar set—where each bus bar from the first bus bar set is coupled to the first transparent conductive layer—being alternated with a second bus bar set—where each bus bar from the second bus bar set is coupled to the second transparent conductive layer—around the edge of the substrate 100. In one embodiment, the bus bar arrangement includes a bus bar from each the first and the second bus bar set disposed along at least two sides of the substrate. In one embodiment, the bus bar arrangement includes a bus bar from the second bus bar set on at least three sides of the substrate. In one embodiment, the bus bar arrangement includes a bus bar from the first bus bar set on at least four sides of the substrate.

In one embodiment, the first bus bar 210, the second bus bar 220, the third bus bar 230, and the fourth bus bar 240 can be along a first side 202 of the electrochemical device 200. The third bus bar 230 can be between the second bus bar 220 and the fourth bus bar 240. The fourth bus bar 240 can be between the second bus bar 220 and the first bus bar 210. In one embodiment, the second bus bar 220 can be along the first side 202 and a second side 204 of the device 200. In one embodiment, the fifth bus bar 250 can be along a third side 206 of the device 200. In another embodiment, the sixth bus bar 260 and the eighth bus bar 280 can be along the fourth side 208 of the device 200. In one embodiment, the second bus bar 220 and the seventh bus bar 270 can be along the second side 204 of the device 200.

In one embodiment, the first bus bar 210 can be substantially parallel to the fourth bus bar 240. In one embodiment, the seventh bus bar 270 can be generally non-parallel to the first bus bar 210. In one embodiment, the fifth bus bar 250 can be orthogonal to the first bus bar 210. In one embodiment, the fifth bus bar 250 is the only bus bar on the third side 206. In one embodiment, the first bus bar 210 can be substantially parallel to the second bus bar 220. The transparent conductive layers can have a sheet resistance (ohms/square) that is approximately ten times the linear resistance (ohms/meter) of the bus bars. Gaps can be between each bus bar of the device 200. Gaps between bus bars can allow the transparent conductive layer to act as a resistor between the gaps and allow a continuously graded state to be maintained in the gaps between the bus bars. In one embodiment the gaps between each bus bar can be substantially the same lengths. In one embodiment, the gaps between each bus bar can be different from one another.

In one embodiment, the voltage supply terminals can set their respective bus bars to voltages such that the second bus bar 220 is greater than the third bus bar 230 is greater than the fifth bus bar 250 is greater than the first bus bar 210 (220>230>250>210). In another embodiment, the voltage supply terminals can set their respective bus bars to voltages such that the fourth bus bar 240 is approximately equal to the voltage of the seventh bus bar 270. In one embodiment, first voltage supply terminal can set the voltage for the first bus bar 210 at a value within about 0.5V, such as 0.4V, such as 0.3V, such as 0.2V, such as 0.1V to the voltage set by the voltage supply terminals for the fourth bus bar 240, sixth bus bar 260, and seventh bus bar 270.

In one embodiment, the electrochemical device 200 can include a first zone, a second zone, and a third zone. The first zone can be defined by the first voltage supply terminal and first bus bar 210, the sixth voltage supply terminal and sixth bus bar 260, and the fifth voltage supply terminal and fifth bus bar 250. The second zone can be defined by the third voltage supply terminal and third bus bar 230, and the eighth voltage supply terminal and eighth bus bar 280. The third zone can be defined by the fourth voltage supply terminal and fourth bus bar 240, the seventh voltage supply terminal and seventh bus bar 270, and the second voltage supply terminal and second bus bar 220. In operation, zone one, zone two, and zone three can have different tinting states. By doing so, zone 1 can be at full tint, zone three can be at a clear state, and zone two can be between a full tint and clear state such that the entire electrochromic device appears continuously graded.

In another embodiment, as seen in FIG. 3, the first bus bar 310, the fourth bus bar 340, the seventh bus bar 370, and the sixth bus bar 360 can be connected to a first transparent conductive layer while the second bus bar 320, the third bus bar 330, the fifth bus bar 350, and the eighth bus bar 350 can be connected to a second transparent conductive layer. In one embodiment, the electrochemical device 300 can include a first zone, a second zone, and a third zone. In one embodiment, a single bus bar from the grouping connected to the second transparent conductive layer can span more than one side of the substrate. For example, the second bus bar 320 can be along a second side 304 and a third side 306. In another embodiment, more than one bus bar from the grouping connected to the second transparent conductive layer can span more than one side of the substrate. For example, the second bus bar 320 can be along a second side 304 and a third side 306 while the third bus bar can be along the first side 302 and the second side 304. In another embodiment, a single bus bar can be along a side. For example, the fifth bus bar can be along a fourth side 308 and the sixth bus bar can be along a fifth side 312. In another embodiment, one or more bus bars from the grouping connected to the first transparent conductive layer can span more than one side of the substrate. In one embodiment, a bus bar arrangement can include a pattern of a first bus bar set—where each bus bar from the first bus bar set is coupled to the first transparent conductive layer—being alternated with a second bus bar set—where each bus bar from the second bus bar set is coupled to the second transparent conductive layer—around the edge of the substrate 100. In one embodiment, the bus bar arrangement includes a bus bar from each the first and the second bus bar set disposed along at least three sides of the substrate. In one embodiment, the bus bar arrangement includes a bus bar from each the first and the second bus bar set disposed along only three sides of the substrate. In one embodiment, the bus bar arrangement includes a bus bar from the second bus bar set on at least three sides of the substrate. In one embodiment, the bus bar arrangement includes a bus bar from the second bus bar set on only three sides of the substrate. In one embodiment, the bus bar arrangement includes a bus bar from the first bus bar set on at least four sides of the substrate.

Figure 4:
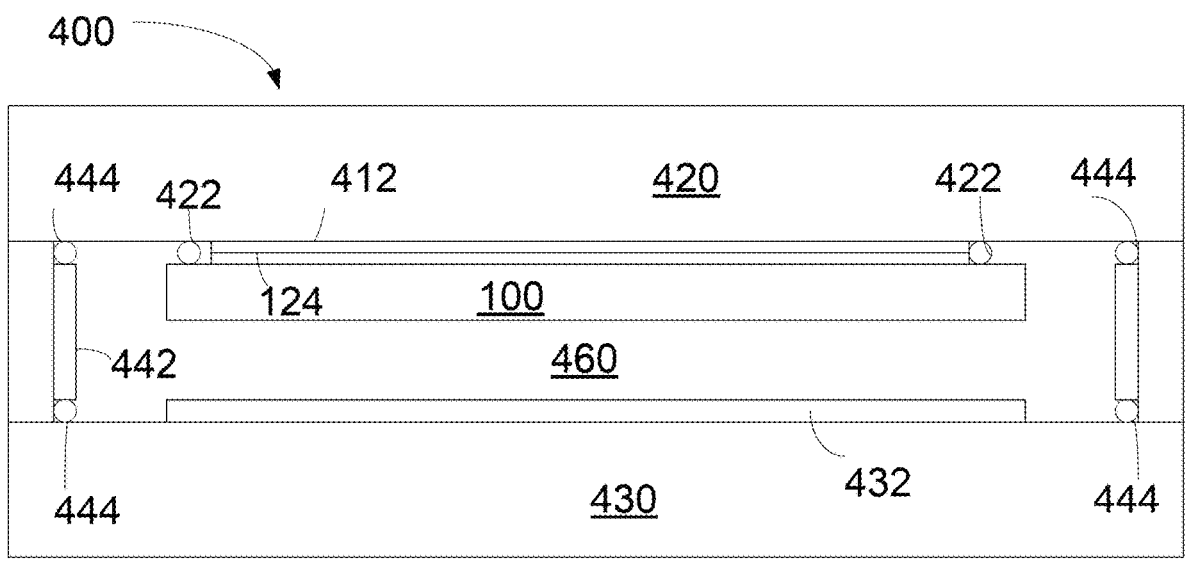
FIG. 4 includes an illustration of a cross-sectional of an insulated glass unit (IGU).

FIG. 4 includes an illustration of a cross-sectional view of an insulated glass unit (IGU) 400 that includes the substrate 100 and the electrochromic device 124, 200, 300 as illustrated in FIGS. 1, 2, and 3. The IGU 400 further includes a counter substrate 420 and a solar control film 412 disposed between the electrochromic device 124 and the counter substrate 420. A seal 422 is disposed between the substrate 100 and the counter substrate 420 and around the electrochromic device 124. The seal 422 can include a polymer, such as polyisobutylene. The counter substrate 420 is coupled to a pane 430. Each of the counter substrate 420 and pane 430 can be a toughened or a tempered glass and have a thickness in a range of 2 mm to 9 mm. A low-emissivity layer 432 can be disposed along an inner surface of the pane 430. The counter substrate 420 and pane 430 can be spaced apart by a spacer bar 442 that surrounds the substrate 100 and electrochromic device 124. The spacer bar 442 is coupled to the counter substrate 420 and pane 430 via seals 444. The seals 444 can be a polymer, such as polyisobutylene. The seals 444 can have the same or different composition as compared to the seal 422.

An internal space 460 of the IGU 400 may include a relatively inert gas, such as a noble gas or dry air. In another embodiment, the internal space 460 may be evacuated. The IGU can include an energy source, a control device, and an input/output (I/O) unit. The energy source can provide energy to the electrochromic device 124 via the control device. In an embodiment, the energy source may include a photovoltaic cell, a battery, another suitable energy source, or any combination thereof. The control device can be coupled to the electrochromic device and the energy source. The control device can include logic to control the operation of the electrochromic device. The logic for the control device can be in the form of hardware, software, or firmware. In an embodiment, the logic may be stored in a field programmable gate array (FPGA), an application-specific integrated circuit (ASIC), or another persistent memory. In an embodiment, the control device may include a processor that can execute instructions stored in memory within the control device or received from an external source. The I/O unit can be coupled to the control device. The I/O unit can provide information from sensors, such as light, motion, temperature, another suitable parameter, or any combination thereof. The I/O unit may provide information regarding the electrochromic device 124, the energy source, or control device to another portion of the apparatus or to another destination outside the apparatus.

Figure 5:
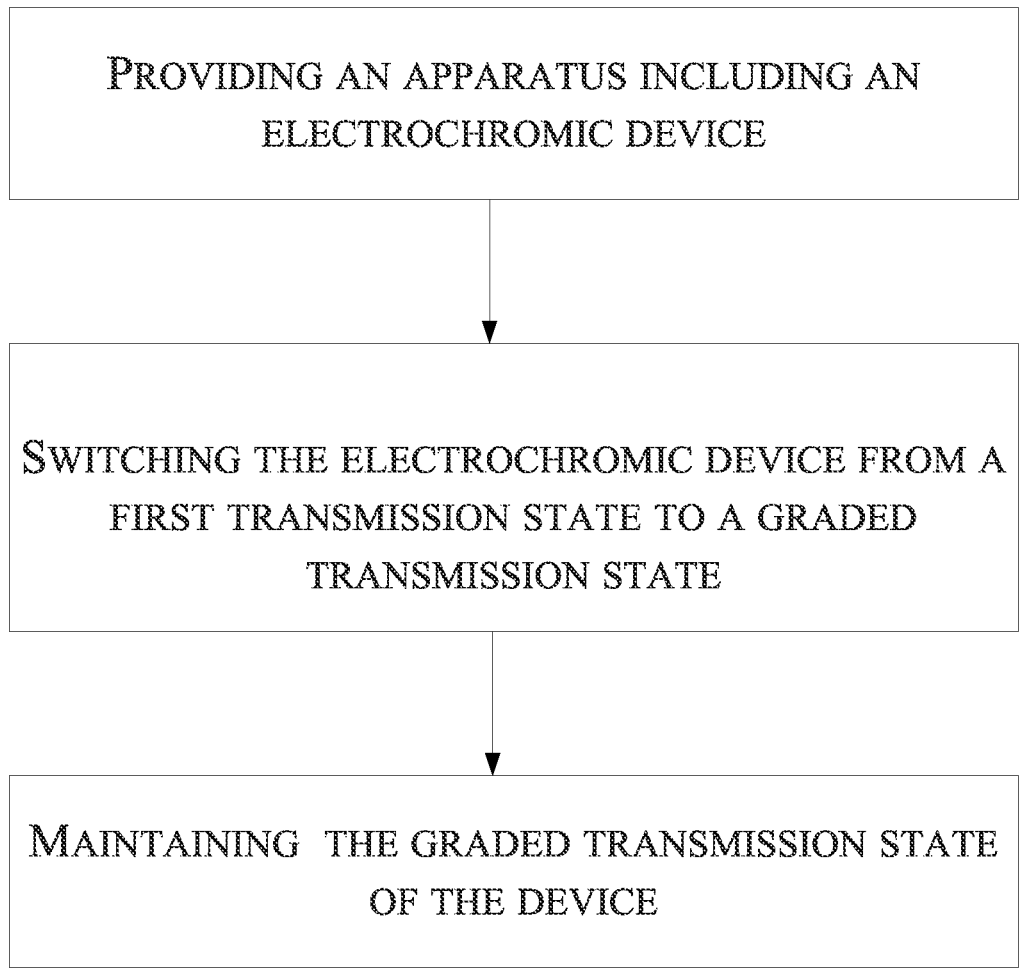
FIG. 5 includes a method of operating an apparatus, according to one embodiment.

FIG. 5 includes a method 500 of operating the apparatus described above. The method 500 can begin at operation 510 by providing the apparatus. The apparatus can be any of the electrochromic devices described above. The method continues at operation 520 by switching the electrochromic device from a first transmission state to a graded transmission state. Switching the electrochromic device can include biasing the first bus bar set to a first voltage and biasing the second bus bar set to a second voltage different from the first voltage. As described above, the voltages can range from 0V to 50V. The method continues at operation 530 by maintaining the graded transmission state of the device.

Embodiments as illustrated and described above can allow a continuously graded electrochromic device to be maintained for nearly any period of time after switching transmission states is completed. Further designs can be useful to reduce power consumption, provide more flexibility, simplify connections, or combinations thereof. An electrochromic device can have a portion that is in a continuously graded transmission state and another portion with a substantially uniform transmission state. The precise point where transition between the continuously graded transmission state and the substantially uniform transmission state may be difficult to see. For example, the portion with the continuously graded transmission state can be fully bleached at one end and fully tinted at the other. The other portion may be fully bleached and be located beside the fully bleached end of the continuously graded portion, or the other portion may be fully tinted and be located beside the fully tinted end of the continuously graded portion. Embodiments with discrete grading between portions may be used without deviating from the concepts described herein. For example, an electrochromic device can maintain a portion near the top of a window that is fully bleached, and a remainder that is continuously graded from fully tinted transmission state closer to the top of the window to a fully bleached transmission state near the bottom of the window. Such an embodiment may be useful to allow more light to enter to allow better color balance within the room while reducing glare. In still another embodiment, an electrochromic device can be maintained in a continuously graded state without any portion maintained in a substantially uniform transmission state. Clearly, many different transmission patterns for an electrochromic device are possible.

Many different aspects and embodiments are possible. Some of those aspects and embodiments are described below. Exemplary embodiments may be in accordance with any one or more of the ones as listed below.

Embodiment 1. An apparatus including a triangular substrate. The triangular substrate can include a first side, a second side, and a third side. The apparatus can also include an active stack disposed on the substrate. The active stack can include a first transparent conductive layer, a second transparent conductive layer, an anodic electrochemical layer between the first transparent conductive layer and the second transparent conductive layer, and a cathodic electrochemical layer between the first transparent conductive layer and the second transparent conductive layer. The apparatus can also include a first bus bar electrically coupled to the first transparent conductive layer. The first bus bar can be along the first side and the second side of the triangular substrate. The apparatus can also include a second bus bar electrically coupled to the second transparent conductive layer. The second bus bar can be along the first side of the triangular substrate. The apparatus can also include a third bus bar electrically coupled to the second transparent conductive layer. The third bus bar can be along the second side of the triangular substrate.

Embodiment 2. The apparatus of embodiment 1, further including a fourth bus bar electrically coupled to the first transparent conductive layer, wherein the fourth bus bar can be along the third side of the triangular substrate.

Embodiment 3. The apparatus of embodiment 1, further including a fifth bus bar electrically coupled to the second transparent conductive layer, wherein the fifth bus bar can be along the first side of the triangular substrate between the first bus bar and the second bus bar.

Embodiment 4. The apparatus of embodiment 3, further including a sixth bus bar electrically coupled to the first transparent conductive layer, wherein the sixth bus bar can be along the first side of the triangular substrate between the first bus bar and the fifth bus bar.

Embodiment 5. The apparatus of embodiment 1, further including a seventh bus bar electrically coupled to the second transparent conductive layer, wherein the seventh bus bar can be along the second side of the triangular substrate between the first bus bar and the third bus bar.

Embodiment 6. The apparatus of embodiment 5, further comprising a eighth bus bar electrically coupled to the first transparent conductive layer, wherein the eighth bus bar can be along the second side of the triangular substrate between the seventh bus bar and the third bus bar.

Embodiment 7. The apparatus of embodiment 1, wherein each bus bar is separated by a gap.

Embodiment 8. The apparatus of embodiment 1, further including a first power supply terminal coupled to the first bus bar; a second power supply terminal coupled to the second bus bar; a third power supply terminal coupled to the third bus bar; a fourth power supply terminal coupled to the fourth bus bar; and a control device configured such that the second and fourth power supply terminals are at the same voltages and the first and third power supply terminals are at different voltages during a same time period.

Embodiment 9. An apparatus including a substrate comprising at least four sides, an active stack on the substrate. The active stack can include a first transparent conductive layer, a second transparent conductive layer, an anodic electrochemical layer between the first transparent conductive layer and the second transparent conductive layer, and a cathodic electrochemical layer between the first transparent conductive layer and the second transparent conductive layer. The apparatus can also include a first bus bar set comprising a plurality of bus bars, wherein each bus bar of the first bus bar set is electrically coupled to the first transparent conductive layer, a second bus bar set comprising a plurality of bus bars, wherein each bus bar of the second bus bar set is electrically coupled to the second transparent conductive layer, and a bus bar arrangement wherein the bus bar arrangement comprises a bus bar from the first bus bar set and a bus bar from the second bus bar set on at least three sides of the substrate.

Embodiment 10. The apparatus of embodiment 9, wherein the bus bar arrangement can include a bus bar from the first bus bar set disposed along two sides of the substrate.

Embodiment 11. The apparatus of embodiment 9, wherein the bus bar arrangement can include a bus bar from the second bus bar set disposed along two sides of the substrate.

Embodiment 12. The apparatus of embodiment 9, wherein the bus bar arrangement can be configured to alternate between a bus bar from the first bus bar set and a bus bar from the second bus bar set along the periphery of the substrate.

Embodiment 13. The apparatus of embodiment 9, wherein the bus bar arrangement comprises only a bus bar from the first bus bar set on at least one side of the substrate.

Embodiment 14. The apparatus of embodiment 9, wherein the bus bar arrangement comprises only a bus bar from the second bus bar set on at least one side of the substrate.

Embodiment 15. The apparatus of embodiment 9, wherein the substrate is a trapezoid.

Embodiment 16. The apparatus of embodiment 9, wherein the substrate is a parallelogram.

Embodiment 17. The apparatus of embodiment 9, wherein the substrate is a pentagon.

Embodiment 18. The apparatus of any one of embodiments 1 or 9, wherein the active stack further comprises an ion conducting layer between the cathodic electrochemical layer and the anodic electrochemical layer.

Embodiment 19. The apparatus of any one of embodiments 1 or 9, wherein the first transparent conductive layer is between the substrate and the second transparent conductive layer.

Embodiment 20. The apparatus of any one of embodiments 1 or 9, further including a first panel and a laminate between the first panel and the substrate.

Embodiment 21. The apparatus of embodiment 20, further including a second panel and a spacer between the first panel and the second panel.

Embodiment 22. A method of operating an apparatus can include providing an electroactive device. The electroactive device can include an active stack. The active stack can include a first transparent conductive layer, a second transparent conductive layer, an anodic electrochemical layer between the first transparent conductive layer and the second transparent conductive layer, and a cathodic electrochemical layer between the first transparent conductive layer and the second transparent conductive layer. The electroactive device can also include a first bus bar set comprising a plurality of bus bars, wherein each bus bar of the first bus bar set is electrically coupled to the first transparent conductive layer, a second bus bar set comprising a plurality of bus bars, wherein each bus bar of the second bus bar set is electrically coupled to the second transparent conductive layer, and a bus bar arrangement wherein the bus bar arrangement comprises a bus bar from the first bus bar set and a bus bar from the second bus bar set on at least three sides of the substrate. The method can also include switching the electrochromic device from a first transmission state to a graded transmission state, wherein switching the electrochromic device comprises biasing the first bus bar set to a first voltage and biasing the second bus bar set to a second voltage different from the first voltage and maintaining the graded transmission state.

Embodiment 23. The method of embodiment 22, wherein the graded transmission state is a continuously graded transmission state.

Embodiment 24. An apparatus may include a triangular substrate comprising a first side, a second side, and a third side, at least one active layer, a first transparent conductive layer, a second transparent conductive layer, a first bus bar electrically coupled to the first transparent conductive layer, wherein the first bus bar is along the first side and the second side of the triangular substrate, a second bus bar electrically coupled to the second transparent conductive layer, wherein the second bus bar is along the first side of the triangular substrate, and a third bus bar electrically coupled to the second transparent conductive layer, wherein the third bus bar is along the second side of the triangular substrate.

Embodiment 25. An apparatus may include a substrate comprising at least four sides, a first transparent conductive layer, a second transparent conductive layer, at least one active layer, a first bus bar set comprising a plurality of bus bars, wherein each bus bar of the first bus bar set is electrically coupled to the first transparent conductive layer, a second bus bar set comprising a plurality of bus bars, wherein each bus bar of the second bus bar set is electrically coupled to the second transparent conductive layer, and a bus bar arrangement wherein the bus bar arrangement comprises a bus bar from the first bus bar set and a bus bar from the second bus bar set on at least three sides of the substrate.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatuses and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An apparatus comprising:
    a substrate comprising at least four sides;
    an active stack on the substrate, the active stack comprising:
        a first transparent conductive layer; and
        a second transparent conductive layer;
    a first bus bar set comprising a plurality of bus bars, wherein each bus bar of the first bus bar set is electrically coupled to the first transparent conductive layer;
    a second bus bar set comprising a plurality of bus bars, wherein each bus bar of the second bus bar set is electrically coupled to the second transparent conductive layer, and
    a bus bar arrangement wherein the bus bar arrangement comprises a first bus bar from the first bus bar set wrapping around a first corner, a second bus bar from the first bus bar set wrapping around a second corner, a bus bar from the second bus bar set between the first bus bar of the first bus bar set and the second bus bar of the first bus bar set, wherein a bus bar from the first bus bar set and the second bus bar set disposed along at least two sides of the substrate, wherein the bus bar arrangement alternates between a bus bar from the first bus bar set and a bus bar from the second bus bar set along the periphery of the substrate, and wherein only a bus bar from the second bus bar set is on at least one side of the substrate.

2. The apparatus of claim 1, wherein the first corner is where two sides of the at least four sides of the substrate meet.

3. The apparatus of claim 2, wherein wrapping around the first corner comprises the first bus bar from the first bus bar set continuously going from one side of the two sides of the first corner to a second side of the two sides of the first corner.

4. The apparatus of claim 1, wherein each bus bar is separated by a gap.

5. The apparatus of claim 1, wherein the active stack further comprises:
    an anodic electrochemical layer between the first transparent conductive layer and the second transparent conductive layer; and
    a cathodic electrochemical layer between the first transparent conductive layer and the second transparent conductive layer.

6. The apparatus of claim 1, wherein the first corner is different from the second corner.

7. The apparatus of claim 1, wherein the bus bar arrangement comprises only a bus bar from the first bus bar set on at least one side of the substrate.

8. The apparatus of claim 1, wherein the active stack further comprises an ion conducting layer between the cathodic electrochemical layer and the anodic electrochemical layer.

9. The apparatus of claim 1, wherein the active stack further comprises an anodic electrochemical layer between the first transparent conductive layer and the second transparent conductive layer and a cathodic electrochemical layer between the first transparent conductive layer and the second transparent conductive layer.

10. The apparatus of claim 1, wherein the first transparent conductive layer is between the substrate and the second transparent conductive layer.

11. An apparatus comprising:
    a substrate comprising at least four sides;
    a first transparent conductive layer;
    a second transparent conductive layer;
    at least one active layer;
    a first bus bar set comprising a plurality of bus bars, wherein each bus bar of the first bus bar set is electrically coupled to the first transparent conductive layer;
    a second bus bar set comprising a plurality of bus bars, wherein each bus bar of the second bus bar set is electrically coupled to the second transparent conductive layer, and
    a bus bar arrangement wherein the bus bar arrangement comprises a first bus bar from the first bus bar set wrapping around a first corner, a second bus bar from the first bus bar set wrapping around a second corner, and a bus bar from the second bus bar set between the first bus bar of the first bus bar set and the second bus bar of the first bus bar set, wherein the bus bar arrangement is configured to alternate between a bus bar from the first bus bar set and a bus bar from the second bus bar set along the periphery of the substrate, wherein a bus bar from the first bus bar set and a bus bar from the second bus bar set are in-line with each other along the periphery.

12. The apparatus of claim 11, wherein the substrate is a trapezoid.

13. The apparatus of claim 11, wherein the first corner is where two sides of the at least four sides of the substrate meet.

14. The apparatus of claim 13, wherein wrapping around the first corner comprises the first bus bar from the first bus bar set continuously going from one side of the two sides of the first corner to a second side of the two sides of the first corner.

15. The apparatus of claim 14, wherein each bus bar is separated by a gap.

16. The apparatus of claim 15, wherein the bus bar arrangement further comprises a bus bar from the first bus bar set and a bus bar from the second bus bar set on at least three sides of the substrate.

17. The apparatus of claim 16, wherein the bus bar arrangement comprises only a bus bar from the second bus bar set on at least one side of the substrate.

\* \* \* \* \*